United States Patent

Clemente et al.

[11] 3,979,145
[45] Sept. 7, 1976

[54] HOT PAN HANDLING DEVICE

[75] Inventors: A. Harry Clemente, New Castle; Alfredo A. Clemente, Newark, both of Del.

[73] Assignee: Jumpan Corporation, Newark, Del.

[22] Filed: June 10, 1975

[21] Appl. No.: 585,768

[52] U.S. Cl. .................................. 294/32
[51] Int. Cl.² ................................ A47J 45/10
[58] Field of Search ................ 294/2, 7, 9, 10, 12, 294/14, 26, 26.5, 27 R, 32, 50; 99/393, 394; 206/499; 211/126; 224/45 G, 45 Q, 46 R, 46 T, 48 R, 48 F

[56] References Cited
UNITED STATES PATENTS

| | | | |
|---|---|---|---|
| 537,682 | 4/1895 | Haines | 294/32 |
| 632,352 | 9/1899 | Jones | 294/2 |
| 850,983 | 4/1907 | Valiquette | 294/32 |
| 901,671 | 10/1908 | Bennett et al. | 294/7 |
| 980,735 | 1/1911 | Armstrong | 294/32 |
| 1,728,211 | 9/1929 | McClellan | 294/32 |
| 1,739,033 | 12/1929 | Jakubowski | 294/32 |
| 1,781,635 | 11/1930 | Fischacher | 294/32 |
| 2,435,805 | 2/1948 | Tanner | 294/50 X |
| 2,688,290 | 9/1954 | McDevitt | 294/26.5 |

*Primary Examiner*—Johnny D. Cherry
*Attorney, Agent, or Firm*—Connolly and Hutz

[57] ABSTRACT

Hot pan handling device comprises bottom wall of sheet-like material with opposite side walls and single front end wall of sheet-like material integrally connected thereto and extending upwardly therefrom. Such construction provides device with open back. Side handle is connected to each of opposite side walls and handles extend generally upwardly therefrom. Front end handle is connected to front end wall and extends generally outwardly therefrom. Hot pan is manipulated onto bottom wall of handling device by way of open back thereof and transported by lifting side handles.

3 Claims, 4 Drawing Figures

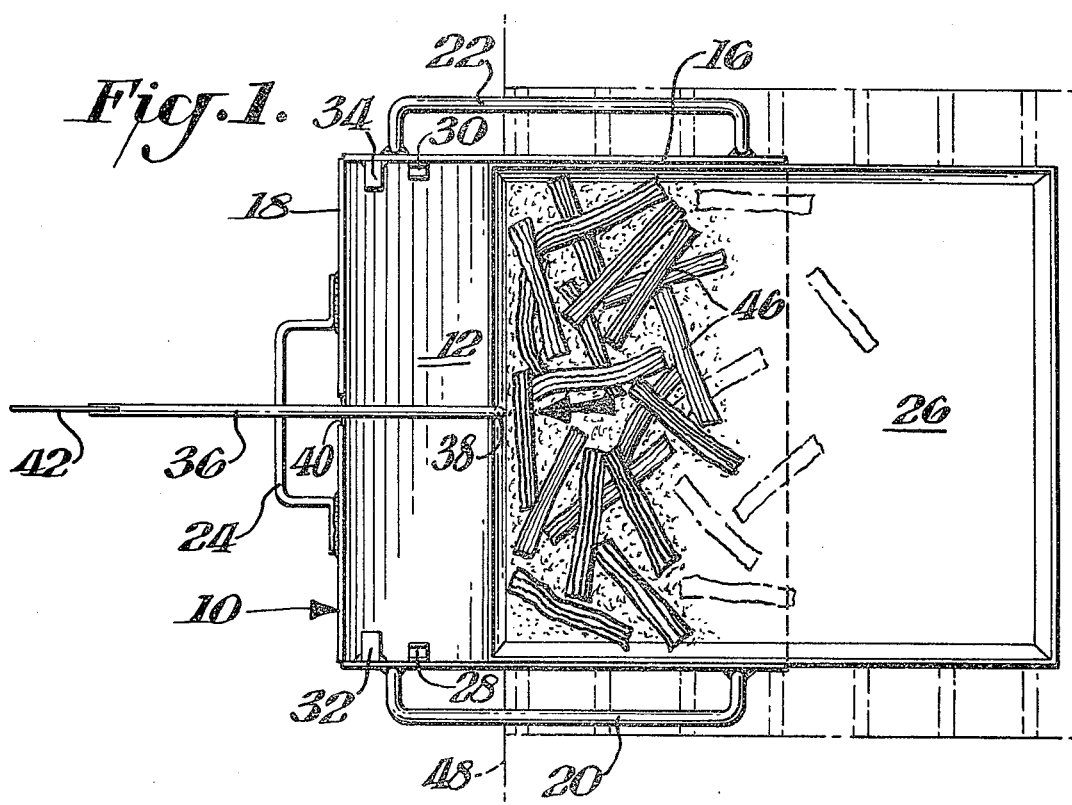
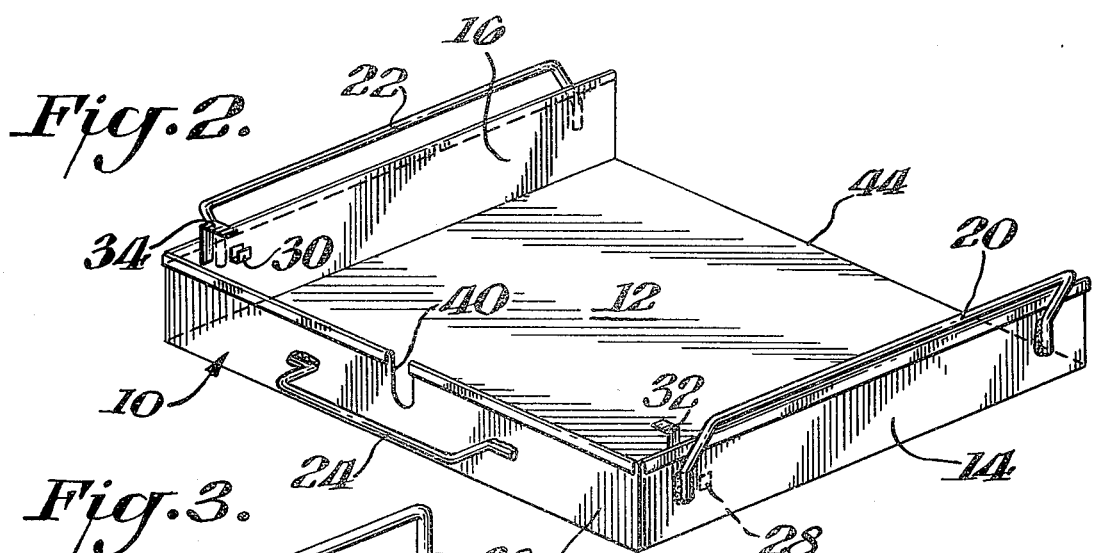
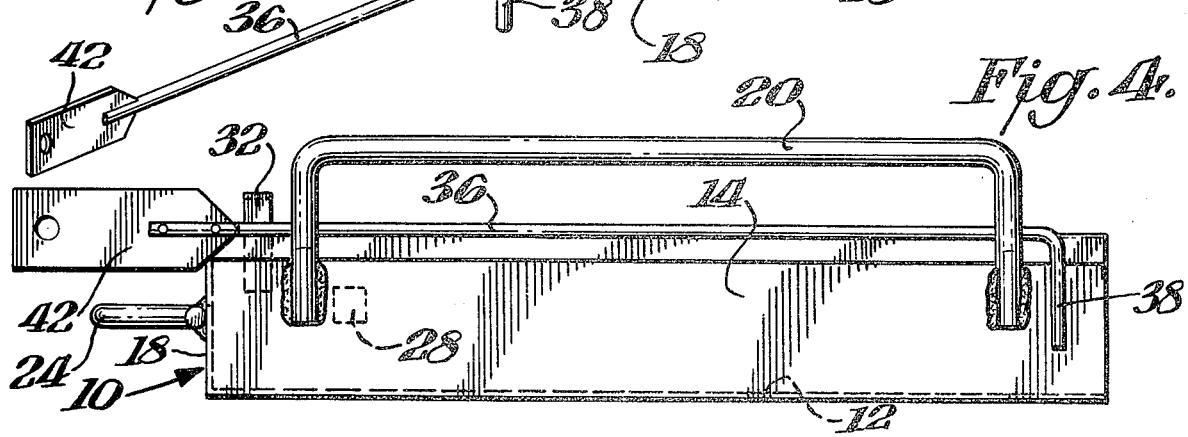

HOT PAN HANDLING DEVICE

BACKGROUND OF THE INVENTION

The present invention relates to a handling device, and more particularly to a device for handling hot pans.

Prior to the present invention, numerous structures have been proposed for handling heavy and hot pans of the type traditionally utilized in preparing large food amounts for institutional use or otherwise. For the most part, the devices heretofore proposed for handling this type of food are both structurally and functionally inadequate. For example, asbestos gloves function to prevent burns due to exposure to hot surfaces and open flames, but being fabric, the asbestos will absorb hot liquids which often cause serious burns. Moreover, asbestos gloves become saturated with grease which significantly contributes to the premature wear of the gloves. While rubber gloves do not absorb hot liquids, continuous exposure to heat often causes such gloves to burn, melt or otherwise deform. Towels, pads and rags not only absorb hot liquids but are also susceptible of catching on fire. These makeshift arrangements offer no protection to the hands or arms of the persons handling the hot pans. Hence, an efficient and safe device has long been sought for handling hot and heavy pans.

Numerous article handling devices have been proposed over the years for manipulating, storing and transporting a variety of different articles. For example, U.S. Pat. No. 3,517,825, granted June 30, 1970, describes a device for handling linens and the like which is easily loaded and unloaded. Moreover, U.S. Pat. No. 3,482,708, granted Dec. 9, 1969, discloses stacking trays for office use while U.S. Pat. No. 3,717,259, granted Feb. 20, 1973, shows a rack construction for mounting trays ladened with small containers, shallow dishes and other small items. In each instance, the above constructions are totally unacceptable for handling hot pans and the structure of the present invention is significantly different from these patents.

SUMMARY OF THE INVENTION

Accordingly, it is an object of the present invention to provide a hot pan handling device which is simple in construction and easy to use and which has numerous beneficial features for the safety of the person utilizing the device in the handling of a hot pan.

In accordance with the present invention, a hot pan handling device comprises a bottom wall of sheet-like material with opposite side walls and a single front end wall of sheet-like material integrally connected thereto and extending upwardly therefrom. The resultant structure provides the device with an open back. A side handle is connected to each of the opposite side walls and each handle extends generally upwardly from its associated side wall. A front end handle is connected to the front end wall of the device and extends generally outwardly therefrom. A hot pan may be manipulated onto the bottom wall of the handling device by way of the open back thereof and transported by lifting the side handles.

It is preferred that the side handles extend both upwardly and outwardly from the side walls of the handling device to thereby position those handles away from a hot pan on the device. Preferably, these handles extend both upwardly and outwardly at an angle of approximately 45°. Also, the side handles extend above the upper boundary of the side walls of the handling device. These structural features position the hands of the operator away from the hot pan and its contents.

Pan retaining projections may be connected to the side walls of the device in close proximity to the front end wall thereof. These projections extend toward one another and are spaced from the bottom wall to thereby extend over a pan to retain it on the device.

The hot pan handling device of the present invention is used in combination with a push-pull bar for pushing and pulling hot pans off of and on to a handling device. The push-pull bar has a downturned end for manipulating hot pans, and the front end wall of the device includes a cut-out portion for guiding and supporting the push-pull bar during the pan manipulation operation. The cut-out portion may be open at the upper boundary of the front end wall. Also, it is preferred that the end of the push-pull bar opposite the downturned end include a substantially flat element for prying hot pans upwardly to facilitate positioning the device thereunder.

Preferably, the bottom wall, the opposite side walls and the front end walls are fabricated from sheet metal material.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 1 is a top plan view of a hot pan handling device according to the present invention;

FIG. 2 is a pictorial view illustrating the hot pan handling device shown in FIG. 1;

FIG. 3 is a pictorial view illustrating a push-pull bar used in combination with the device of FIG. 2 as shown in FIG. 1; and FIG. 4 is a side elevational view illustrating the push-pull bar in its stored position.

DETAILED DESCRIPTION OF THE INVENTION

Referring in more particularity to the drawings, a hot pan handling device 10 comprises a bottom wall 12 of sheet-like material with opposite side walls 14, 16 and a single front end wall 18 of sheet-like material integrally connected to the bottom wall 12 and extending upwardly therefrom. As shown best in FIG. 2, this overall construction provides the device 10 with an open back. Side handles 20, 22 are connected one to each of the opposite side walls 14, 16, and the handles extend generally upwardly from the side walls. A front end handle 24 is connected to the front end wall 18 and extends generally outwardly therefrom. A hot pan 26 is manipulated onto the bottom wall 12 of the handling device 10 by way of the open back thereof and transported by lifting the side handles 20, 22, as explained more fully below.

The bottom, side and front end walls are fabricated from sheet metal, and the handles 20, 22, 24 may be fabricated from rod-shaped metal and secured to the side walls 14, 16, 18 by welding, for example. The side handles 20, 22 extend both upwardly and outwardly from the side walls of the device at an angle of approximately 45° to thereby position these handles away from a hot pan 26 on the device. Moreover, the side handles extend above the upper boundary of the side walls 14, 16. These structural features of the handles 20, 22 position the hands of the operator away from the hot pan and its contents. Also, in many instances, the hot pan is on the device for a period of time sufficient to elevate the temperature of the sides 14, 16, and it is therefore important to position the handles above the upper boundary of the side walls. Conduction of heat to the handles of the device is only minimal since there is only minimal contact between the handles and the side walls.

The construction of the present invention also includes a first pair of pan retaining projections 28, 30 connected to and extending away from the side walls of the device toward one another and in close proximity to the front end wall 18. The projections are spaced from the bottom wall 12 and are arranged to extend over a pan to retain it on the device. In other words, when the pan 26 shown in FIG. 1 is fully urged onto the device 10, the pan retaining projections 28, 30 fit over the upper boundary of the side walls of the pan to thereby retain the pan on the device. These projections prevent the pan from tipping backward should the load thereon be heavier on the end of the pan away from the front wall of the device.

Generally, the first pair of pan retaining projections 28, 30 are used to retain low pans of the type used for browning purposes. However, when the handling device 10 is used to handle deeper pans of the roasting type, a second pair of pan retaining projections 32, 34 is provided for retaining such a deep pan on the device. The pan retaining projections 32, 34 are connected to and extend away from the side walls of the device toward one another. Also, as shown in the drawing, these projections are in close proximity to the end wall of the device. Since the deeper pans usually include angled side walls, the first pair of projections 28, 30 do not interfer with positioning the deep pan on the handling device so that the pan is completely forward on the device.

Finally, although this feature is not illustrated in the drawing, the pan retaining projections may be adjustably mounted to the side walls 14, 16 in order to vary the elevation of the retaining portions thereof. For example, the vertical section of the projections may include a slot whereby loosening of a fastener would enable adjustment of the projections at various elevations.

FIG. 3 illustrates a push-pull bar 36 for pushing and pulling hot pans off of and on to the handling device 10. The push-pull bar has a downturned end 38 for manipulating the hot pans, and the front end wall 18 of the device 10 includes a cutout 40 for guiding and supporting the push-pull bar during the pan manipulation operation. The cut-out portion 40 is open at the upper boundary of the front end wall. Moreover, the end of the push-pull bar 36 opposite the downturned end 38 includes a substantially flat element 42 for prying hot pans upwardly to facilitate positioning the device 10 thereunder, as explained more fully below. Also, the push-pull bar is designed to rest between one of the side handles 20, 22 and its associated side walls 14, 16, as shown best in FIG. 4.

In use, the back edge 44 of the handling device 10 may be urged under the front of a pan 26 used for browning bacon 46. Alternatively, the flat element 42 of the push-pull bar 36 may be used to pry the front of the hot pan 26 upwardly to facilitate positioning the back edge 44 of the device under the pan. After such positioning the push-pull bar 36 is used to pull the pan 26 onto the device. The downturned end 38 hooks onto the front of the pan 26 while the bar is guided by the cut-out 40. Pulling on the pan 26 via the push-pull bar 36 and pushing on the device via the front handle 24 ultimately positions the pan on the device. The side handles 20, 22 are then grasped and the hot pan 26 is moved away from the heat source to a desired location. Should any hot liquids or grease spill from the pan 26 such spillage is retained by the device 10 which protects the operator from serious burns. Generally, the device with a hot pan thereon is handled so that the front thereof is slightly lower than the back of the device. Also, while a portion of the pan 26 is out of engagement with the device the major portion of the pan is supported by the device, and the pan retaining projections prevent tipping of the pan away from the device.

The push-pull bar 36 is also used to push a hot pan off of the device. This is particularly useful when the pan is removed from the broiler or oven for turning its contents and then returned. The push-pull bar 36 is then conveniently used to push the pan off of the device and into the broiler or oven.

The device 10 of the present invention serves an important function in handling heavily loaded hot cooking pans which are often laden with hot liquids or grease. These cooking pans are often closely spaced to one another or the hot side walls of the commercial ovens and broilers. The present invention enables manipulation of these hot pans while protecting the operator from serious injury from the hot pan, the hot contents thereof and the hot surfaces of the oven or broiler.

What is claimed is:

1. A combination of a hot pan handling device and a push-pull bar for pushing and pulling hot pans off of and onto the handling device, the handling device comprising a bottom wall of sheet-like material with opposite side walls and a single front end wall of sheet-like material integrally connected thereto and extending upwardly therefrom to thereby provide the handling device with an open back, a cut-out portion approximately located in the mid portion of the front end wall and open at the upper boundary of that wall, a side handle connected to each of the opposite side walls and extending generally upwardly therefrom, a front end handle connected to the front end wall and extending generally upwardly therefrom whereby a hot pan may be manipulated onto the bottom wall of the handling device by way of the open back thereof and transported by lifting the side handles, and the push-pull bar having a downturned end for manipulating hot pans with a substantially flat element at the opposite end of the bar for prying hot pans upwardly to facilitate positioning the handling device thereunder, and the cut-out portion in the front end wall of the handling device cooperating with the push-pull bar for guiding and supporting the bar during the pan manipulation operation.

2. A combination as in claim 1 wherein the side handles extend both upwardly and outwardly from the side walls of the handling device and above the upper boundary of such side walls to thereby position those handles away from a hot pan on the handling device.

3. A combination as in claim 1 including pan retaining projections connected to and extending away from the side walls of the handling device toward one another and in close proximity to the front end wall of the device, the projections being spaced from the bottom wall and arranged to extend over a pan to retain it on the handling device.

* * * * *